United States Patent
Kaneda

(10) Patent No.: US 9,342,020 B2
(45) Date of Patent: May 17, 2016

(54) PRINTING APPARATUS USING TECHNIQUE TO HANDLE ERROR IN FINISHER, CONTROL METHOD THEREFOR, AND STORAGE MEDIUM

(71) Applicant: CANON KABUSHIKI KAISHA, Tokyo (JP)

(72) Inventor: Takeshi Kaneda, Yokohama (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 0 days.

(21) Appl. No.: 14/447,025

(22) Filed: Jul. 30, 2014

(65) Prior Publication Data

US 2015/0050034 A1 Feb. 19, 2015

(30) Foreign Application Priority Data

Aug. 14, 2013 (JP) .................................. 2013-168567

(51) Int. Cl.
*G03G 15/00* (2006.01)
*B65H 7/06* (2006.01)
*G06F 3/12* (2006.01)

(52) U.S. Cl.
CPC .................. *G03G 15/55* (2013.01); *B65H 7/06* (2013.01); *G03G 15/6582* (2013.01); *G03G 15/6588* (2013.01); *B65H 2511/10* (2013.01); *B65H 2511/414* (2013.01); *B65H 2511/528* (2013.01); *B65H 2515/112* (2013.01); *B65H 2801/27* (2013.01); *G03G 15/6594* (2013.01); *G03G 15/70* (2013.01); *G03G 2215/00481* (2013.01); *G03G 2215/00485* (2013.01); *G06F 3/1211* (2013.01); *G06F 3/1255* (2013.01); *G06F 3/1285* (2013.01)

(58) Field of Classification Search
CPC ... G03G 15/55; G03G 15/6588; G03G 15/70; G03G 15/6594; G03G 15/6508; B65H 2511/52; B65H 2511/528; B65H 2511/529; B41J 29/38; B41J 29/46
See application file for complete search history.

(56) References Cited

U.S. PATENT DOCUMENTS

2010/0167891 A1 7/2010 Sakata

FOREIGN PATENT DOCUMENTS

| JP | 2006297654 | \* 11/2006 | ................ B41J 29/38 |
| JP | 2010-150036 A | 7/2010 | |

\* cited by examiner

*Primary Examiner* — Blake A Tankersley
(74) *Attorney, Agent, or Firm* — Rossi, Kimms & McDowell LLP

(57) ABSTRACT

An image forming apparatus which uses a printing control technique for, even when a third-party finisher whose performance is unknown is connected to the image forming apparatus, realizing a sheet-feeding judgment with consideration given to the performance of the finisher and preventing degradation of working efficiency. When an error notification is received from a post-processing apparatus, a type of a sheet discharged to the post-processing apparatus is identified. The identified type is managed as a type of a prohibited sheet prohibited from being discharged to the post-processing apparatus.

6 Claims, 9 Drawing Sheets

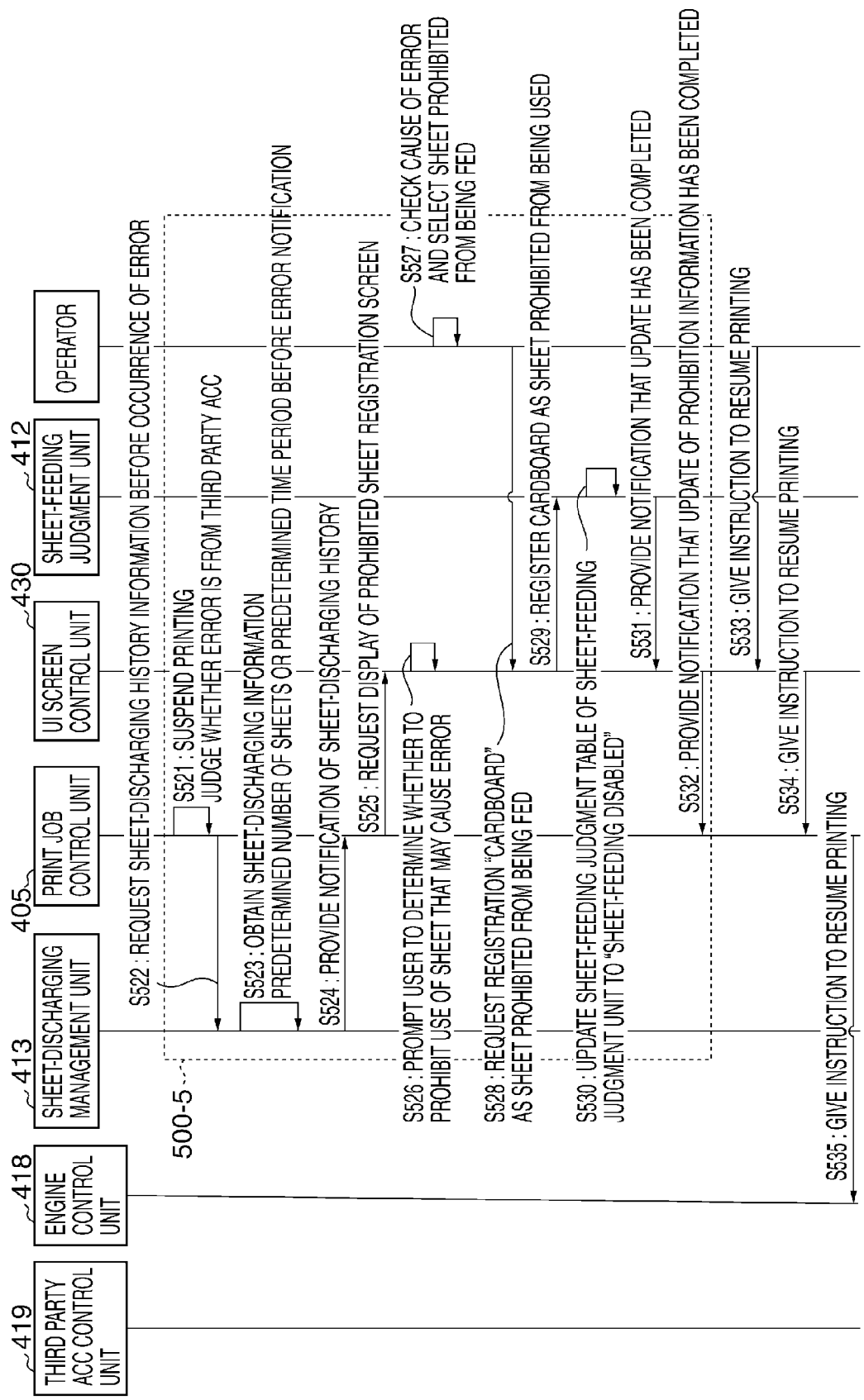

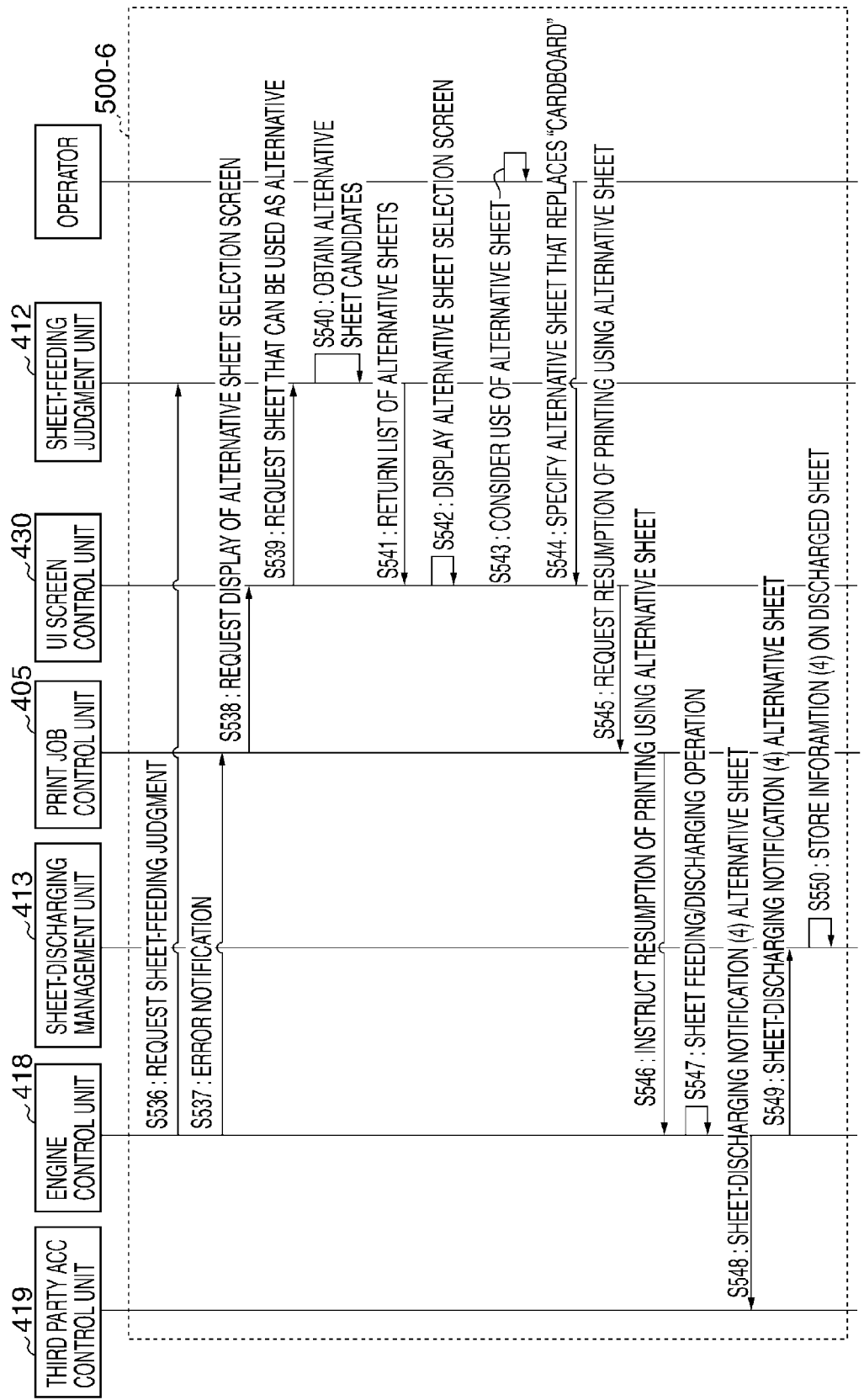

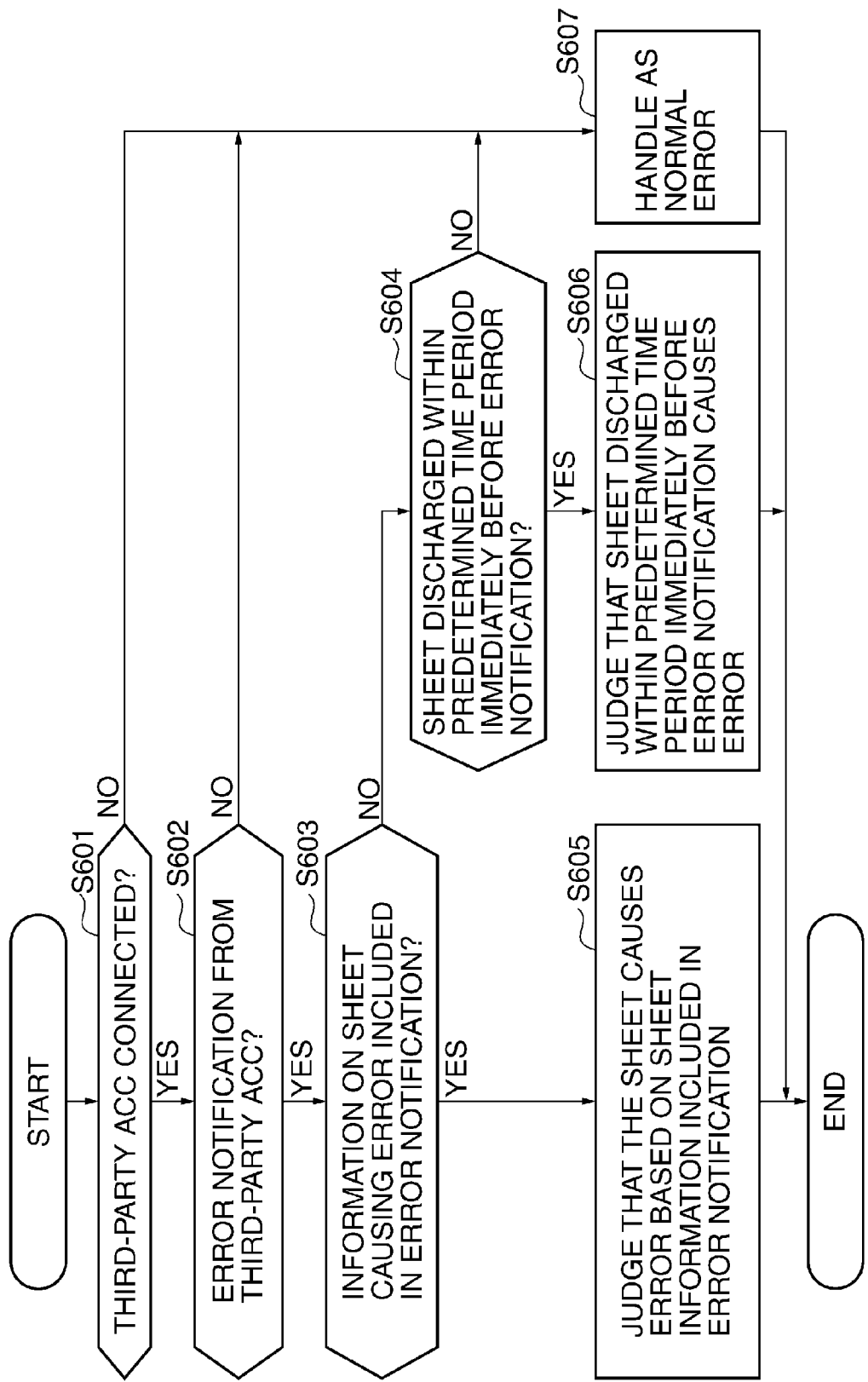

FIG. 6

{ TRUE : SHEET-FEEDING ENABLED
FALSE : SHEET-FEEDING DISABLED

{ 0x01 : LONGEDGE FEED
0x02 : SHORTEDGE FEED
0x03 : L/S FEED

{ 0x01 : PLAIN SHEET
0x02 : THIN SHEET
0x03 : CARDBOARD

| ID (701) | SIZE (702) | TYPE (703) | BASIS WEIGHT (GSM) (704) | | FEEDING DIRECTION (MM) (705) | | WIDTH DIRECTION (MM) (706) | | SHEET-FEEDING ORIENTATION (707) | SHEET-FEEDING ENABLE-DISABLE FLAG (708) |
|---|---|---|---|---|---|---|---|---|---|---|
| | | | LOWER LIMIT | UPPER LIMIT | LOWER LIMIT | UPPER LIMIT | LOWER LIMIT | UPPER LIMIT | | |
| 01 | CUSTOM SHEET | 0x01 | 80 | 105 | 182.0 | 297.0 | 210.0 | 256.9 | 0x03 | TRUE |
| 02 | CUSTOM SHEET | 0x03 | 129 | 150 | 182.0 | 297.0 | 210.0 | 256.9 | 0x03 | TRUE |
| 03 | CUSTOM SHEET | 0x02 | 64 | 79 | 182.0 | 297.0 | 210.0 | 256.9 | 0x03 | TRUE |
| 04 | CUSTOM SHEET | 0x01 | 80 | 105 | 279.4 | 457.2 | 210.0 | 256.9 | 0x02 | TRUE |
| ⋮ | | | | | | | | | | |
| n | CUSTOM SHEET | 0x03 | 80 | 105 | 279.4 | 457.2 | 210.0 | 256.9 | 0x02 | TRUE |

(700)

PRINTING APPARATUS USING TECHNIQUE TO HANDLE ERROR IN FINISHER, CONTROL METHOD THEREFOR, AND STORAGE MEDIUM

BACKGROUND OF THE INVENTION

1. Field of the Invention

The present invention relates to a printing apparatus and a control method therefore, and in particular to a printing apparatus using a technique to handle an error occurring in a third-party finisher.

2. Description of the Related Art

In many cases, finishers (post-processing apparatuses) used in a state of being connected to image forming apparatuses which are printing apparatuses designed for offices are provided by the same manufacturers as those who manufacture the image forming apparatuses, and hence the image forming apparatuses can easily obtain detailed performance information on the finishers. For example, when an image forming apparatus to which a finisher with a saddle binding function is connected receives a print job involving a saddle binding process, the image forming apparatus carries out a process explained hereafter. Namely, before instructing the finisher to carry out the saddle binding process, the image forming apparatus checks each time whether or not housed sheets can be saddle-bound, size and basis weight of the sheets, the total number of sheets in a bundle to be fed at the same time and ascertains whether or not conditions for carrying out the saddle binding process are satisfied. When, in this advance checking, the prohibiting conditions are satisfied, the image forming apparatus generally indicates an error based on the prohibiting conditions and waits for an instruction from an operator.

Japanese Laid-Open Patent Publication (Kokai) No. 2010-150036 discloses an arrangement in which, when settings on post-processing (for example, the width of a Z-fold) is received from a user, whether or not it is possible to carry out post-processing is determined based on the settings received from the user. In this case, when it is determined that it is impossible to carry out post-processing, a warning screen is displayed.

For the needs of customers, however, there are various types of finishers used in a state of being connected to image forming apparatuses for print on demand (POD) markets, and in many cases, they are provided from manufactures different from those who manufacture the image forming apparatuses.

When an image forming apparatus and a finisher manufactured by different manufactures are used in a state of being connected each other, they are loosely coupled to each other by a universal I/F. In this connection method, it is unnecessary to define new I/F specifications whenever a new finisher is added, but the image forming apparatus cannot obtain performance information on each of the finishers and thus cannot realize sheet feeding, sheet discharging, and error processing suitable for performance of the finishers.

In particular, an operator who handles a POD machine heavily weights working efficiency and availability, he or she does not want to suspend a printing process or a finishing process due to an error in settings of a print job or inadequate submitted document data. For this reason, before a printing process is started, settings of a print job are usually checked against performance of a device to make a judgment in advance before the start of printing, but there are many combinations of a finisher and an image forming apparatus that the image forming apparatus cannot grasp detailed performance information on the finisher. As a result, it is difficult to make a judgment in advance based on appropriate prohibition information.

SUMMARY OF THE INVENTION

The present invention provides an image forming apparatus using a printing control technique for, even when a third-party finisher whose performance is unknown is connected to the image forming apparatus, realizing a sheet-feeding judgment with consideration given to performance of the finisher and preventing degradation of working efficiency, a control method therefore, and a computer-readable storage medium storing a program for implementing the control method.

Accordingly, a first aspect of the present invention provides a printing apparatus comprising a printing unit configured to perform printing, a sheet-discharging unit configured to discharge a sheet, on which the printing has been performed, to a post-processing apparatus, an identifying unit configured to, upon receiving an error notification from the post-processing apparatus, identify a type of the sheet discharged to the post-processing apparatus by the sheet-discharging unit, and a management unit configured to manage the type, which has been identified by the identifying unit, as a type of a prohibited sheet prohibited from being discharged to the post-processing apparatus.

Accordingly, a second aspect of the present invention provides a control method for a printing apparatus comprising a printing step of performing printing, a sheet-discharging step of discharging a sheet, on which the printing has been performed, to a post-processing apparatus, an identifying step of, upon receiving an error notification from the post-processing apparatus, identifying a type of the sheet discharged to the post-processing apparatus in the sheet-discharging step, and a management step of managing the type, which has been identified in the identifying step, as a type of a prohibited sheet prohibited from being discharged to the post-processing apparatus.

Accordingly, a third aspect of the present invention provides a non-transitory computer-readable storage medium storing a program for causing a computer to execute a control method for a printing apparatus, the control method comprising a printing step of performing printing, a sheet-discharging step of discharging a sheet, on which the printing has been performed, to a post-processing apparatus, an identifying step of, upon receiving an error notification from the post-processing apparatus, identifying a type of the sheet discharged to the post-processing apparatus in the sheet-discharging step, and a management step of managing the type, which has been identified in the identifying step, as a type of a prohibited sheet prohibited from being discharged to the post-processing apparatus.

According to the present invention, when an error notification is received from the post-processing apparatus, a type of a sheet discharged to the post-processing apparatus can be identified, and the identified type is managed as a type of a prohibited sheet prohibited from being discharged to the post-processing apparatus. As a result, even when a third party-manufactured finisher as the post-processing apparatus is connected to the printing apparatus, a sheet-feeding judgment can be made with consideration given to performance of the finisher. Consequently, an operator can avoid occurrence of repeated errors such as jams caused by an inappropriate sheet feeding/sheet discharging process and prevent degradation of working efficiency.

Further features of the present invention will become apparent from the following description of exemplary embodiments (with reference to the attached drawings).

BRIEF DESCRIPTION OF THE DRAWINGS

FIGS. 4A to 4C are sequences showing a flow from occurrence of an error to resumption of printing in the image forming apparatus main body in FIG. 3.

FIG. 5 is a flowchart showing in detail a judgment process carried out by the print job control unit in S521 in FIG. 4B.

FIG. 6 is a view showing an exemplary sheet-feeding judgment table held in a sheet-feeding judgment unit.

FIGS. 7A and 7B are views showing exemplary prohibited sheet registration screens for registering sheets prohibited from being fed, in which FIG. 7A shows a screen displayed when a sheet causing an error cannot be identified, and FIG. 7B shows a screen displayed when a sheet causing an error can be identified.

DESCRIPTION OF THE EMBODIMENTS

The present invention will now be described with reference to the drawings showing an embodiment thereof.

Figure 1:
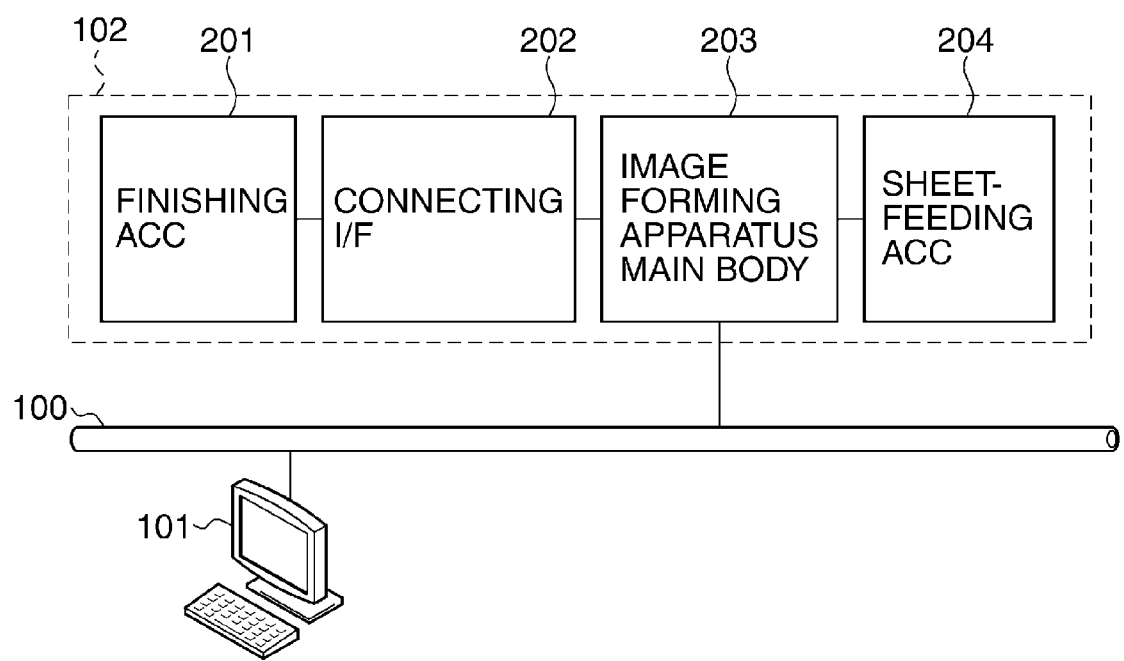
FIG. 1 is a diagram schematically showing an exemplary arrangement of an image forming apparatus which is a printing apparatus according to an embodiment of the present invention.

FIG. 1 is a diagram schematically showing an exemplary arrangement of an image forming apparatus which is a printing apparatus according to an embodiment of the present invention.

Referring to FIG. 1, the image forming apparatus 102 is comprised of a third-party finishing accessory (finishing ACC) 201 (post-processing apparatus), a connection interface (I/F) 202, an image forming apparatus main body 203, and a sheet-feeding accessory (sheet-feeding ACC) 204. The example shown in the figure represents an exemplary basic arrangement, and other accessory devices may be connected to the image forming apparatus main body 203.

The image forming apparatus 102 is connected to an information processing apparatus 101 via a network 100 such as a LAN (local area network). Although in the example shown in the figure, the information processing apparatus 101 is connected to the network 100, the present invention is not limited to this, but other information processing apparatuses and other image forming apparatuses may be connected to the network 100.

The information processing apparatus 101, which is capable of creating and editing print data, creates print data, for which a sheet size, a sheet type, a sheet-feeding cassette, and so on have been specified, and sends the print data to the image forming apparatus 102.

The image forming apparatus 102 receives print data from the information processing apparatus 101 via the network 100 and carries out a printing process on the print data and a predetermined finishing process specified in the print data.

The sheet-feeding ACC 204 stores sheets of different sizes and different types in a plurality of sheet-feeding cassettes and feeds a designated sheet from a predetermined one of the sheet-feeding cassette to the image forming apparatus main body 203 in response to a sheet-feeding request from the image forming apparatus main body 203.

The image forming apparatus main body 203 requests the sheet-feeding ACC 204 to feed a sheet designated for print data and carries out a printing process on the sheet fed from the sheet-feeding ACC 204, The image forming apparatus main body 203 then discharges the sheet with an image formed thereon to the finishing ACC 201 via the connection I/F 202.

The finishing ACC 201 is able to carry out a case binding process, a ring binder process, and a folding process, which is saddle binding, as finishing processes, but the finishing processes are not limited to them. The finishing ACC 201, which recognizes only the connection I/F 202, carries out a predetermined finishing process on a sheet fed from the connection I/F 202 and discharges the same as printed matter. On the other hand, as with the finishing ACC 201, the image forming apparatus main body 203 recognizes only the connection I/F 202 and does not directly recognize the finishing ACC 201, and hence it is difficult for the image forming apparatus main body 203 to easily obtain information concerning performance or the like from the finishing ACC 201.

Figure 2:
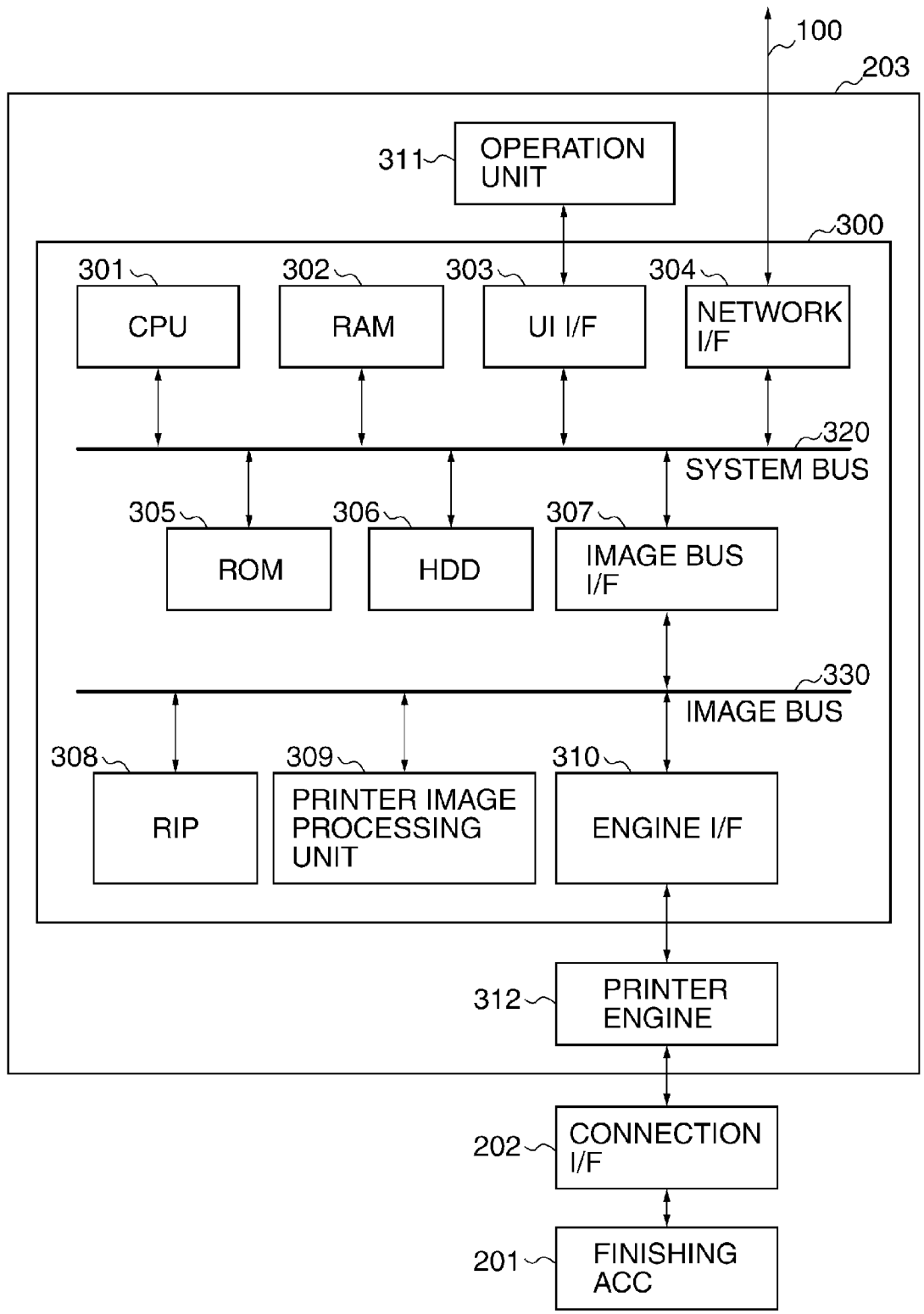
FIG. 2 is a block diagram schematically showing an exemplary hardware arrangement of an image forming apparatus main body in FIG. 1.

FIG. 2 is a block diagram schematically showing an exemplary hardware arrangement of the image forming apparatus main body 203 in FIG. 1.

The image forming apparatus main body 203 has an image processing controller 300, an operation unit 311 which is a user interface (UI) having a display section and an operating section, and a printer engine 312 which is an image output device.

The image processing controller 300 has units such as a CPU 301, a RAM 302, an operation unit (UI) IF 303, a network I/F 304, a ROM 305, an HDD 306, and an image bus I/F 307. These units are connected together via a system bus 320 and carry out communications with one another. The image processing controller 300 also has units such as a raster image processor (RIP) 308, a printer image processing unit 309, and an engine I/F 310, and these units and the image bus I/F 307 are connected together via an image bus 330.

The CPU 301 is a central processing device primarily controls the image forming apparatus main body 203. The RAM 302 is used as work memory for the CPU 301. Various parameters and programs required to start and execute the image forming apparatus main body 203 are stored in the ROM 305 and accessed by the CPU 301 or the like as the need arises.

The UI I/F 303, which is connected to the operation unit 311, notifies the CPU 301 or the like of a signal input from the operation unit 311. The network I/F 304 receives PDL data or the like from the information processing apparatus 101 or the like via the network 100. The received PDL data or the like is stored in the HDD 306.

The HDD 306 temporarily stores the PDL data received via the network 100 and is accessed as a data swap area for the RIP 308 and the printer image processing unit 309.

The image bus I/F 307, which connects the system bus 320 and the image bus 330 to each other, acts as a go-between for communication between the system bus 320 side on which control-related software is running and units associated with page image processing, which are running on the image bus 330.

The RIP 308 is a processor that converts PDL data into an image file such as a bitmap image. The printer image processing unit 309 carries out resolution conversion and correction processing, which are suitable for the printer engine 312, on an image file obtained through conversion by the RIP 303.

The engine I/F 310 is an interface for controlling the printer engine 312. The printer engine 312 actually prints an image file on a medium such as a print sheet using well-known print technology such as electrophotographic: technology and Inkjet technology. The printer engine 312 is connected to the finishing ACC 201 via the connection I/F 202.

Figure 3:
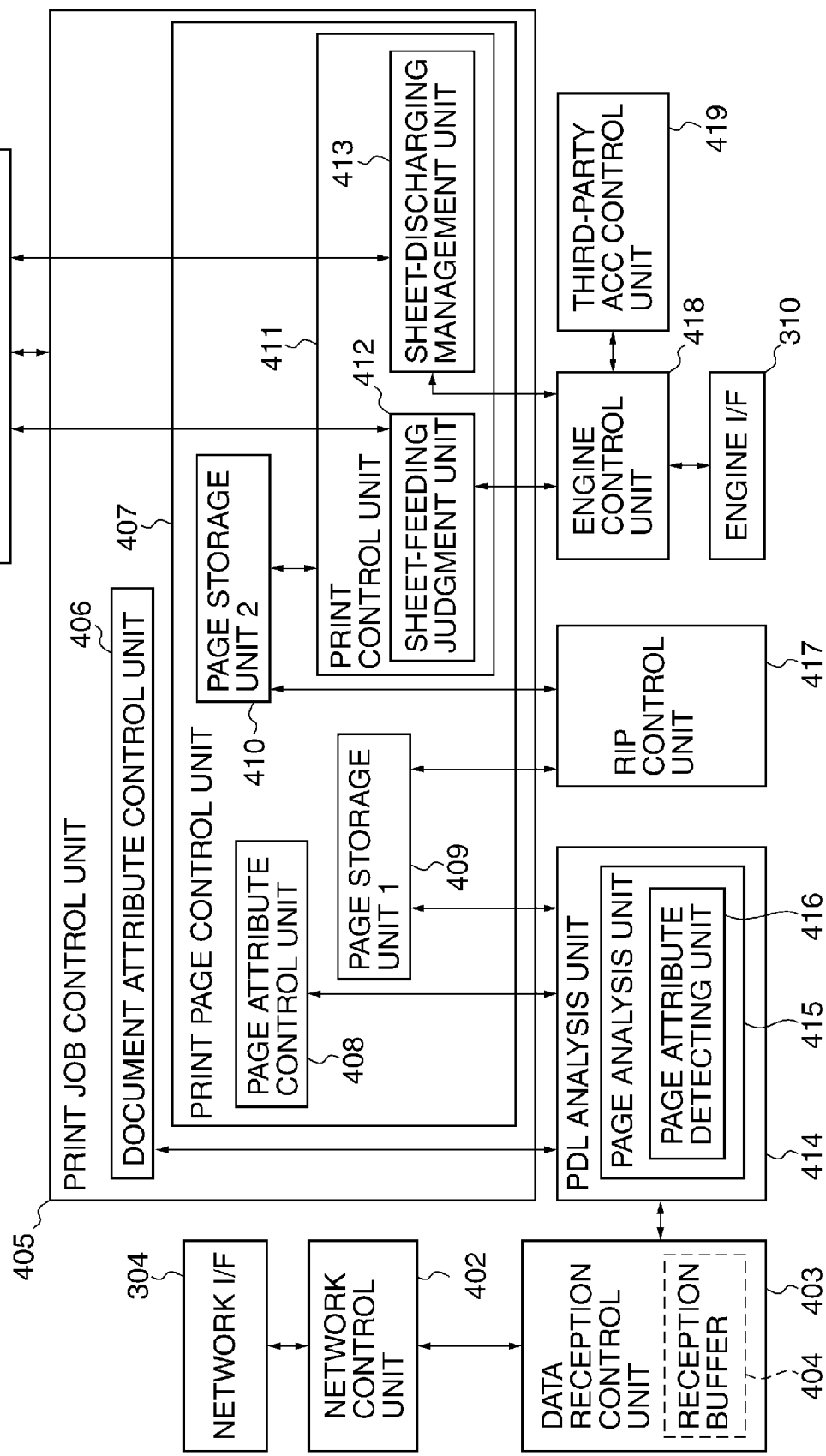
FIG. 3 is a block diagram schematically showing an exemplary software arrangement of the image forming apparatus main body.

FIG. 3 is a block diagram schematically showing an exemplary software arrangement of the image forming apparatus main body 203. It should be noted that the figure also shows a part of the hardware arrangement described above.

Referring to FIG. 3, a print job control unit 405 is comprised of a document attribute control unit 406 and a print page control unit 407. The print page control unit 407 is comprised of a page attribute control unit 408, a page storage unit 1_409, a page storage unit 2_410, and a print control unit 411.

The print job control unit 405, a PDL analysis unit 414, and a UI screen control unit 430 are software modules stored in any of the ROM 305, the RAM 302, and the HDD 306 and executed by the CPU 301. Further, software modules such as the document attribute control unit 406, the page attribute control unit 408, and a sheet-feeding judgment unit 412 are executed by the CPU 301. Temporary data generated when these software modules are executed is stored in the RAM 302.

A RIP control unit 417 operates in conjunction with the RIP 308 and the printer image processing unit 309, which are connected to the image bus 330, as well as the units connected to the system bus 320.

An engine control unit 418 and a third-party ACC control unit 419 control the printer engine 312 and the finishing ACC 201 in conjunction with the engine I/F 310, which is connected to the image bus 330, as well as the units connected to the system bus 320.

The network I/F 304 provides a network control unit 402 with a TCP/IP socket I/F. An application of the information processing apparatus 101 generates PDL data as a print job and sends the PDL data in PDF, PostScript, PCL, XPS, TIFF, JPEG or the like using a transmission protocol RAW or LPR.

The network control unit 402 supporting the RAW/LPR communication protocol receives PDL data from the application of the information processing apparatus 101 and writes the PDL data as successive stream data in the HDD 306 via a data reception control unit 403 and a reception buffer 404 therefore.

When the network control unit 402 receives PDL data, the print job control unit 405 recognizes that reception of a print job has been started and starts processing on the print job. The print job control unit 405 then activates the PDL analysis unit 414 and instructs the PDL analysis unit 414 to read out PDL data accumulated in the HDD 306.

The PDL analysis unit 414 decompresses the PDL data read out from the HDD 306. At this time, a page analysis unit 415 obtains setting information such as a sheet size, sheet type, and a sheet-feeding cassette specified for the PDL data and analyzes a drawing command and carries out a drawing process. Intermediate page data obtained through the drawing process by the page analysis unit 415 is stored in the page storage unit 1_409. The intermediate page data stored in the page storage unit 1_409 is subjected to RIP processing by the RIP control unit 417 and stored as an image, which has been optimized by the printer engine 312, in the page storage unit 2_410.

A page attribute detection unit 416 detects information on a page size, a page sheet type, and so on and sends the information to the page attribute control unit 408 of the print page control unit 407. In particular, in an analyzing process on a top page of a print job, not only page information but also document information associated with settings on the entire document is analyzed by the PDL analysis unit 414. The document information is sent to the document attribute control unit 406 by way of the page analysis unit 415.

The print control unit 411 is comprised of the sheet-feeding judgment unit 412 and a sheet-discharging management unit 413. At the start, of printing, the sheet-feeding judgment unit 412 obtains document attributes of the document attribute control unit 406 and page attributes of the page attribute control unit 408, which are generated from PDL data. Based on the information, the print control unit 411 then determines whether or not to instruct the engine control unit 418 to feed a sheet by referring to a sheet-feeding judgment table 700 (sheet-feeding management information) in the sheet-feeding judgment unit 412. FIG. 6 snows an example of the sheet-feeding judgment table 700.

Referring to FIG. 6, the sheet-feeding judgment table 700 has field information from an ID 701 to a sheet-feeding orientation 707. The ID 701 is an ID uniquely determined with respect to each record. As a size 702, a name "regular-size sheet" is registered when a sheet is a regular-size sheet, and a name "custom sheet" is registered when a sheet is a custom sheet.

As a type 703, a code indicative of a sheet type such as a plain sheet, a thin sheet, or a cardboard is registered. As a basis weight 704, an upper limit, and a lower limit to the basis weight of a sheet, targeted for each record are registered. As a feeding direction 705, an upper limit and a lower limit, to a sheet size in a sub scanning direction of the image forming apparatus are registered. As width direction 706, an upper limit and a lower limit to a sheet size in a main scanning direction of the image forming apparatus are registered. As a sheet-feeding orientation 707, information on sheet-feeding orientations that can be supported is registered.

For example, it is assumed that PDL data for which a custom sheet whose basis weight is 130 gsm, sheet type is cardboard (0×03), and sheet size is 210×297 mm is transmitted from the information processing apparatus 101 to the image forming apparatus 102. In this case, the sheet-feeding judgment unit 412 searches the sheet-feeding judgment table 700 for a record corresponding to page attributes obtained by the page attribute control unit 408. The sheet-feeding judgment unit 412 then returns a value (here, "TRUE") of a sheet-feeding enable-disable flag 708 for ID:02 to the engine control unit 418.

Thus, in response to a sheet-feeding judgment request from the engine control unit 418, the sheet-feeding judgment unit 412 compares an input parameter at the time of request with field information from the ID 701 to the sheet-feeding orientation 707 in the sheet-feeding judgment table 700 and selects a record of the corresponding field information. The sheet-feeding judgment unit 412 then returns a value of the sheet-feeding enable-disable flag 708, which corresponds to the selected record, to the engine control unit 418. It should be noted that basic information at the time of the sheet-feeding judgment request is page information passed from the page attribute control unit 408 to the engine control unit 418.

Referring again to FIG. 3, the sheet-discharging management unit 413 stores a sheet-discharging completion event which the engine control unit 418 has received from the printer engine 312 via the engine I/F 310. At this time, the sheet-discharging management unit 413 records sheet-discharging history information in accordance with a length of a conveying path in the finisher (finishing ACC 201). The sheet-discharging history information, which is comprised of a sheet-discharging time period, type of discharged sheets, number of discharged sheets, and so on, is passed in response to a request from the print job control unit 405. Information recorded as the sheet-discharging history information is set in advance via a screen displayed on the operation unit 311.

The third-party ACC control unit 419 is a module that, when the third-party finishing ACC 201 is connected to the image forming apparatus main body 23, provides control to discharge sheets at an appropriate speed and at appropriate intervals to the finishing ACC 201. The third-party ACC control unit 419 also receives an error notification from the finishing ACC 201 and transfers the same to the engine control unit 413. It should be noted that the third-party ACC control unit 419 may be configured to detect an error such as a jam in the finishing ACC 201 and notifies the engine control unit 418 of the error.

In conjunction with the third-party ACC control unit 419, the engine control unit 413 carries out a sheet-discharging process at a speed and intervals suitable for performance of the finishing ACC 201. Upon receiving a notification about an error in the finishing ACC 201 from the third-party ACC control unit 419, the engine control unit 418 requests the print job control unit 405 to suspend printing.

In ordinary cases, detailed error information about an error occurring on a conveying path managed by the engine control unit 413 can be obtained, but detailed error information about an error occurring on a conveying path in the finishing ACC 201 cannot be obtained.

Thus, upon receiving a print suspending request, from the engine control unit 418, the print, job control unit 405 obtains sheet-discharging history information before notification of an error from the sheet-discharging management unit 413.

Based on the sheet-discharging history information obtained from the sheet-discharging management unit 413, the print job control unit 405 requests the UI screen control unit 430 to display a prohibited sheet registration screen for registering a sheet for which sheet-feeding is prohibited. This prohibited sheet registration screen will be described later.

Figure 4A:
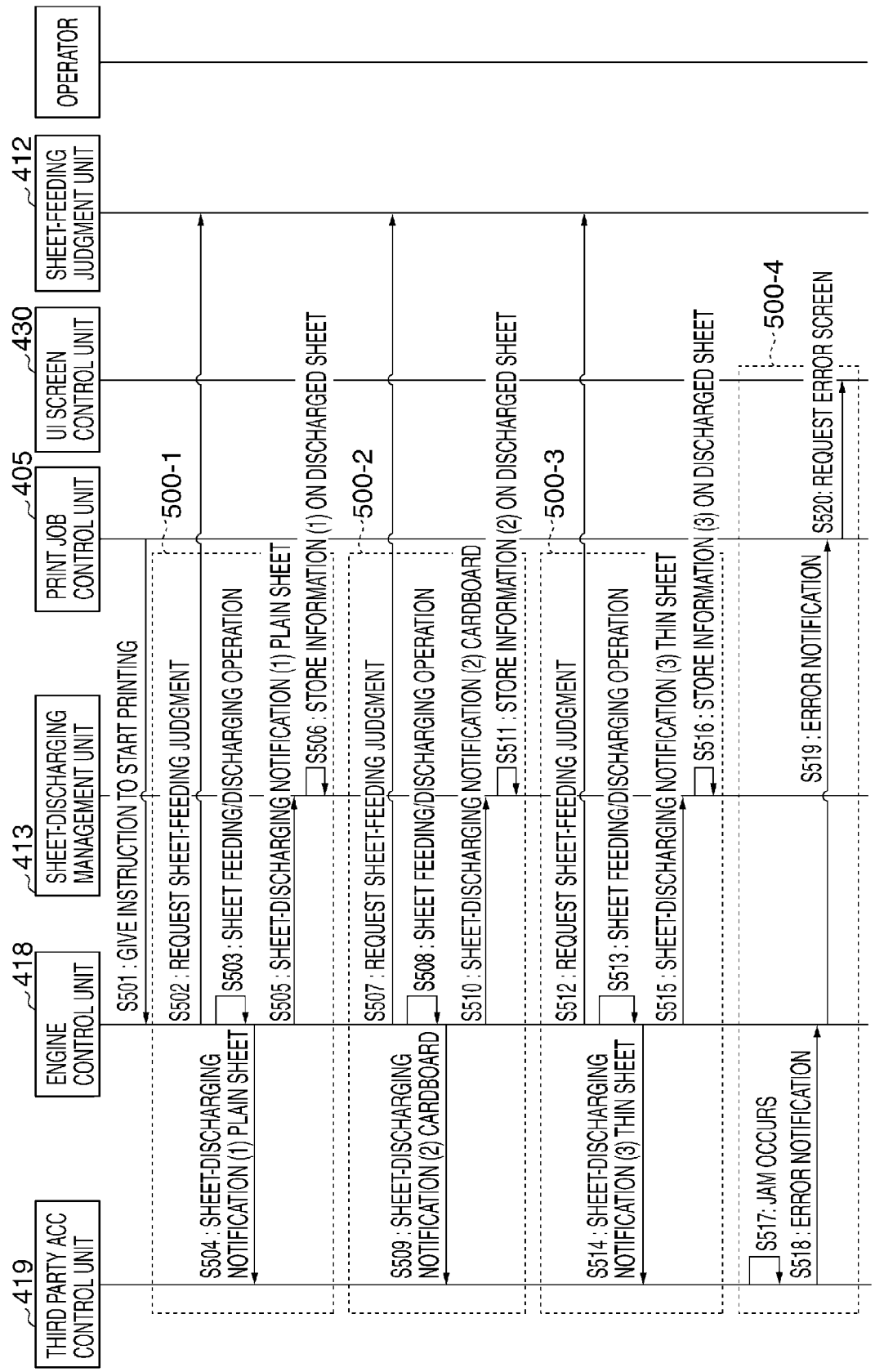

Referring next to FIGS. 4A to 4C, a description will be given of the flow of a printing process carried out by the image forming apparatus main body 203.

FIGS. 4A to 4C show sequences from occurrence of an error to resumption of a printing process in the image forming apparatus main body 203. In the example shown in the figure, sequences in ranges designated by 500-1 (S502 to S506), 500-2 (S507 to S511, and 500-3 (S512 to S516) correspond to sheet feeding/discharging processes for sheets on the first page, the second page, and the third page, respectively.

First, a description will be given of the sequence in the range designated by 500-1. It should be noted that the sequence in the range designated by 500-2 and the sequence in the range designated by 500-3 differ from the sequence in the range designated by 500-1 only in that sheets to foe fed are cardboards and thin sheets, respectively, as compared to plain sheets, and therefore, description thereof is omitted.

First, the print job control unit 405 instructs the engine control unit 418 to start printing (S501).

In response to the print starting instruction, the engine control unit 418 instructs the sheet-feeding judgment unit 412 to judge whether or not sheet feeding is possible (S502), and when the sheet-feeding judgment unit 412 judges that sheet feeding is possible, a sheet is fed/discharged (S503).

The engine control unit 418 then notifies the third-party ACC control unit 419 and the sheet-discharging management unit 413 that the sheet has been discharged (S504 and S505). In response to this, the sheet-discharging management unit 413 holds information on the sheet discharged in S503 (S506).

A sequence in a range designated by 500-4 is a sequence in which the print job control unit 405 is notified of an error that has occurred in the finishing ACC 201.

When a jam or the like occurs in the finishing ACC 201 (S517), the third-party ACC control unit 419 provides an error notification to the engine control unit 418 (S518). Upon receiving the error notification from the third-party ACC control unit 419, the engine control unit 418 provides an error notification to the print job control unit 405 (S519).

Upon receiving the error notification from the engine control unit 418, the print job control unit 405 suspends the sheet-discharging process by suspending the printing process (sheet-discharging control unit) and requests the UI screen control unit 430 to display an error screen (S520).

A sequence in a range designated by 500-5 is a sequence in which after an error occurs, a sheet causing the error is registered as a sheet that cannot be fed.

The print, job control unit 405 determines whether or not the error notification from the engine control unit 418 was provided from the third-party ACC control unit 419 (S521). Upon determining that the error notification from the engine control unit 413 was provided from the third-party ACC control unit 419, the print job control unit 405 requests the sheet-discharging management unit 413 to provide sheet-discharging history information before the error notification (S522).

The sheet-discharging management unit 413 obtains sheet-discharging history information a predetermined number of sheets or a predetermined time period before the error notification (S523) and notifies the print job control unit 405 of the sheet-discharging history information (S524).

Figure 7A:
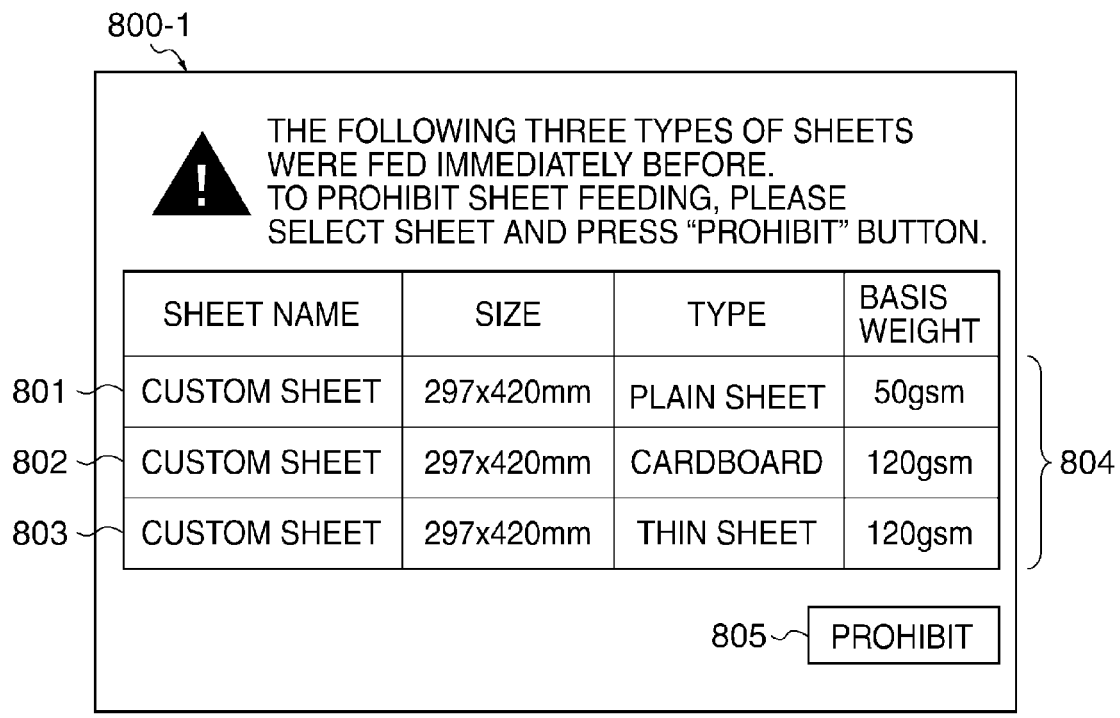
Figure 7B:
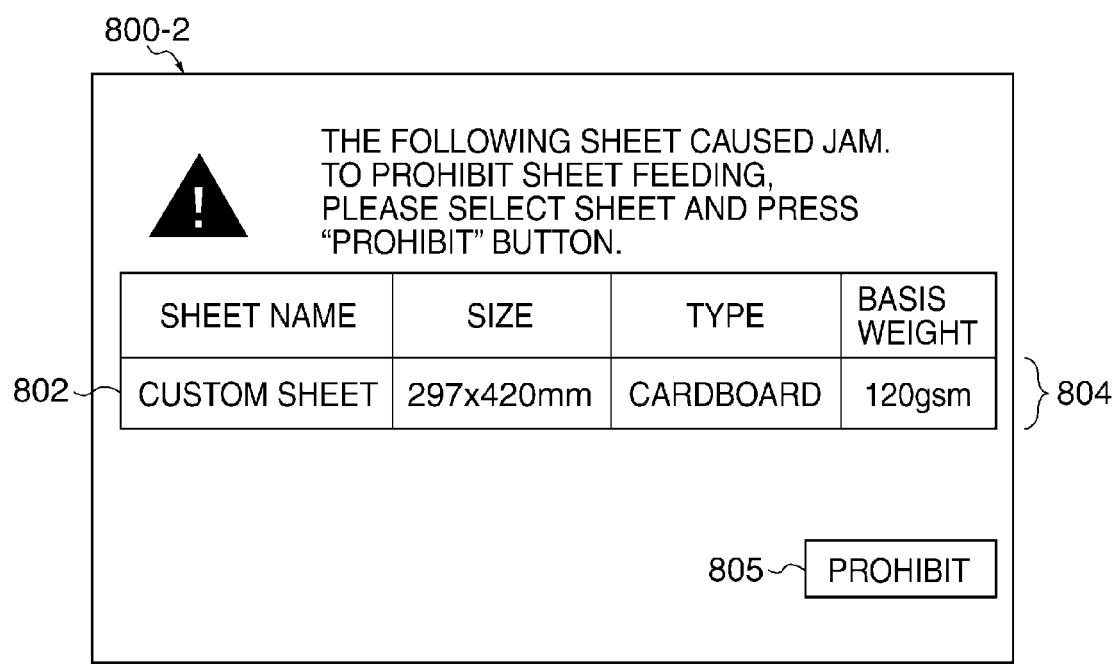

Based on the sheet-discharging history information from the sheet-discharging management, unit 413, the print job control unit 405 requests the UI screen control unit 430 to display a prohibited sheet registration screen (S525). Specifically, the print job control unit 405 obtains, from the sheet-discharging history information, information on a sheet that satisfies predetermined conditions among sheets discharged to the finishing ACC 201 immediately before the print job control unit 405 received the error notification. Then, based on information on the sheet that satisfies the predetermined conditions, the print job control unit 405 requests the UI screen control unit 430 to display a prohibited sheet registration screen. Examples of the sheet, that satisfies the predetermined condition include a sheet discharged to the finishing ACC 201 within a predetermined time period immediately before the print job control unit 405 received the error notification, or a sheet discharged a predetermined number of sheets before the time point the print job control unit 405 received the error notification. FIGS. 7A and 7B shows exemplary prohibited sheet registration screens.

The prohibited sheet registration screens are, when a cause of an error occurred in the third party-manufactured finishing ACC 201 is a sheet discharged from the image forming apparatus main body 203, for an operator to register the sheet. The sheet selected on the prohibited sheet registration screens is not fed in the subsequent printing process.

There are two patterns of prohibited sheet-registration screens consisting of a screen 300-1 in FIG. 7A and a screen 800-2 in FIG. 7B. When a sheet that has caused an error cannot be identified, a list of sheets that may have caused the error is displayed in a list as shown by the prohibited sheet registration screens 800-1. On the other hand, when a sheet that has caused an error can be identified, only one sheet to be prohibited from being fed is displayed as shown by the prohibited sheet registration screens 800-2.

The UI screen control unit 430 obtains, from the sheet-discharging management unit 413, sheets that had been fed or discharged immediately before an error occurred (a predetermined number of sheets or a predetermined time period before an error occurred), and displays the sheets on the operation unit 311 in a list 804. In the list 804, three pieces of sheet information 301 to 803 are displayed. The sheet information includes a sheet name, a sheet size, a sheet type, and a basis weight, but is not limited to them.

An operator selects a sheet that caused an error such as a jam in the finishing ACC 201 from the sheet, information displayed in the list 804 and depresses a prohibition button 805. The depression of the prohibition button 805 causes the sequence from S528 to S532 in FIG. 4B to be executed, and in the sheet-feeding judgment table 700, a value of the sheet-feeding enable-disable flag 708 for the sheet that caused the error is changed from "TRUE" (sheet-feeding permitted) to "FALSE" (sheet-feeding prohibited).

Referring again to FIG. 4B, the UI screen control unit 430 prompts the operator to ascertain whether or not to prohibit feeding of a sheet causing the error by means of the prohibited sheet registration screen (S526). The operator ascertains a cause of the error and selects a sheet to be prohibited from being fed (S527). In the present embodiment, it is assumed that the error is caused by feeding of a "cardboard" through the finishing ACC 201 in the sequence in the range designated by 500-2. In this case, the operator removes the sheet that caused a jam from the finishing ACC 201, refers list information on sheets that may be prohibited from being fed displayed on the screen, and determines whether or not a sheet that should be prohibited from being fed is included in the list, information. When a sheet selected on the screen by the operator is required to be registered as a sheet that cannot be fed in the subsequent printing process, the information on the sheet required to be registered is transmitted to the sheet-feeding judgment unit 412 via the UI screen control unit 430 (S528 and S529).

The sheet-feeding judgment unit 412 then updates the sheet-feeding judgment table 700 with respect to the sheet selected on the prohibited sheet registration screen (S530). For example, the sheet selected on the prohibited sheet registration screen is a cardboard, the value of the sheet feeding enable-disable flag 708 for the cardboard is updated from "TRUE" to "FALSE". Because the sheet-feeding judgment table 700 is updated, the result of sheet-feeding judgment in S507 or the like is that a sheet cannot be fed, and thereafter, sheets of the same type cannot be fed. As a result, an error caused by the same factor can be prevented from repeatedly occurring in the third-party finishing ACC 201.

Then, a notification that, the update of the sheet-feeding judgment table 700 has been completed is provided from the sheet-feeding judgment unit 412 to the UI screen control unit 430, and thereafter, a notification that the update of the sheet-feeding judgment table 700 has been completed is provided from the UI screen control unit 430 to the print job control unit 405 (S531 and S532).

The operator then corrects the error that occurred in the finishing AC 201 and then gives an instruction to resume printing, and the UI screen control unit 430 causes the print job control unit 405 to instruct the engine control unit 418 to resume printing (S533 to S535).

Referring to FIG. 4C, a sequence in a range designated by 500-6 is a sequence in which, when as a result of sheet-feeding judgment, it is judged that a sheet cannot be fed, an alternative sheet is selected, and printing is resumed.

First, due to a cardboard being specified for print data, the engine control unit 418 requests the sheet-feeding judgment unit 412 to judge whether or not a sheet can be fed (S536). As described above, because a cardboard is registered as a prohibited sheet, the sheet-feeding judgment unit 412 returns sheet-feeding disabled to the engine control unit 413. In response to this, the engine control unit 418 notifies the print job control unit 405 of an error (S537).

The print job control unit 405 requests the UI screen control unit 430 to display an alternative sheet selection screen (S538).

The UI screen control unit 430 obtains a list of alternative sheet candidates from the sheet-feeding judgment unit 412 (S539 to S541) and displays on the operation unit 311 an alternative sheet selection screen (not shown) based on the obtained list of alternative sheet candidates (S542).

Then, when the operator specifies an alternative sheet (S543 and S544), the UI screen control unit 430 causes the print job control unit 405 to notify the engine control unit 418 of an instruction to resume printing using the specified alternative sheet (S545 and S546). After that, a sheet feeding/discharging operation using the alternative sheet is carried out (S547 to S550).

FIG. 5 is a flowchart showing in detail a judgment process carried out by the print job control unit 405 in S521 in FIG. 4B.

Referring to FIG. 5, upon receiving an error notification from the engine control unit 418, the print job control unit 405 judges whether or not the third party-manufactured finishing ACC 201 is connected to the connection I/F 202 (step S601). This judgment may be carried out according to whether or not it is possible to obtain performance information on the third party-manufactured finishing ACC 201 connected to the connection I/F 202, and any other method may be used. When, as a result of the judgment in the step S601, the print job control unit 405 judges that the third party-manufactured finishing ACC 201 is connected to the connection I/F 202, the process proceeds to step S602, and on the other hand, when not, the process proceeds to step S607.

In the step S602, the print job control unit 405 judges whether the error notification is originated from the third party-manufactured finishing ACC 201 or the image forming apparatus main body 203. When the print, job control unit 405 judges that the error notification is originated from the third party-manufactured finishing ACC 201, the process proceeds to step S603, and when not, the process proceeds to the step S607.

In the step S603, the print job control unit 405 judges whether or not the error notification includes information on a sheet that caused an error. When the print job control unit 405 judges that the error notification includes information on the sheet (YES), the process proceeds to step S605, and when not (NO), the process proceeds to the step S604.

In the step S605, based on the information on the sheet included in the error notification from the third party-manufactured finishing ACC 201, the print job control unit 405 judges that the sheet caused the error. Moreover, in response to this judgment, the sequence from S522 to S532 in FIG. 4B is performed. In this case, because the sheet causing the error has been identified, the prohibited sheet registration screen 800-1 appearing in FIG. 7B is displayed on the operation unit 311.

On the other hand, in the step S604, the print job control unit 405 judges whether or not a sheet-discharging operation had been performed within a predetermined time period immediately before the error notification was received. For example, when the finishing ACC 201 that carries out a saddle binding process is connected, this process is completed within a predetermined time period (about 10 seconds), and hence a last sheet had been discharged from the image forming apparatus main body 203 within the predetermined time period immediately before the error notification was received. Thus, when a sheet discharging process was carried out within the predetermined time period, the print job control unit 405 judges that an error caused by the sheet discharging process, and the process proceeds to step S606. On the other hand, when a sheet discharging process was not carried out within the predetermined time period, the print job control unit 405 judges that an error different from an error caused by the sheet discharging process occurred, and the process proceeds to the step S607. As a result of the step S604, errors can be limited to only those caused by inappropriate sheet discharging from the image forming apparatus main body 203 among errors notified from the third-party ACC control unit 419.

In the step S606, the print job control unit 405 judges that a sheet discharged within the predetermined time period immediately before the error notification was received caused an error. As a result, the sequence from S522 to S532 in FIG. 4B is performed. In this case, a sheet that caused the error cannot be identified as distinct from the step S605, the prohibited sheet registration screen 800-1 appearing in FIG. 7A is displayed on the operation unit 311.

In the step S607, the sequence from S533 in FIG. 4B onward is performed as normal error processing without performing the sequence from S522 to S532 in the sequence in the range designated by 500-5 in FIG. 4B.

According to the embodiment described above, when a notification of an error is received from the third party-manufactured finishing ACC 201, sheet discharging to the third party-manufactured finishing ACC 201 is suspended, a sheet or sheet candidates that caused the error are identified, and the operator is prompted to register it. Thereafter, whether or not to feed a sheet is judged based on the sheet-feeding enable-disable flag 703 in the sheet-feeding judgment table 700. Thus, conditions for prohibiting sheets in the third party-manufactured finishing ACC 201 whose performance is unknown can be actively registered by the printing apparatus in response to occurrence of an error in the third party-manufactured finishing ACC 201. As a result, even when the third party-manufactured finishing ACC 201 is connected to the printing apparatus, whether or not to feed a sheet can foe judged with consideration given to performance of the third party-manufactured finishing ACC 201. Consequently, the operator can avoid repeated occurrence of errors such as jams caused by inappropriate sheet feeding or sheet discharging and prevent deterioration of working efficiency.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-168567 filed Aug. 14, 2013, which is hereby incorporated by reference herein in its entirety.

What is claimed is:

1. A printing apparatus comprising:
  a printing unit configured to perform printing;
  a sheet-discharging unit configured to discharge a sheet, on which the printing has been performed, to a post-processing apparatus;
  a storing unit configured to store information on a prohibited sheet which is prohibited to be discharged to the post-processing apparatus;
  a receiving unit configured to receive an error notification from the post-processing apparatus;
  an identifying unit configured to identify, when the receiving unit has received the error notification from the post-processing apparatus, a type of a sheet, which has been discharged to the post-processing apparatus immediately before the receiving unit has received the error notification; and
  a display unit configured to display a confirmation screen for a user to confirm whether to register the sheet type identified by the identifying unit as a type of the prohibited sheet,
  wherein in a case where the user issues an instruction to register the sheet type identified by the identifying unit as a type of the prohibited sheet through the confirmation screen, the storing unit registers information on the sheet type identified by the identifying unit as the prohibited sheet.

2. The printing apparatus according to claim 1,
  wherein a plurality of sheet types identified by the identifying unit are displayed on the confirmation screen, and the storing unit stores information on a sheet type selected by the user among the plurality of sheet types as the prohibited sheet.

3. The printing apparatus according to claim 1, further comprising a determining unit configured to determine, when the receiving unit has received the error notification, whether information on a sheet type which has caused an error is included in the error notification,
  wherein in a case where the determination unit determines that the information on the sheet type which has caused the error is included in the error notification, the sheet type indicative of the information included in the error notification is displayed on the confirmation screen, and
  in a case where the determination determines that the information on the sheet type which has caused the error is not included in the error notification, the sheet type identified by the identifying unit is displayed on the confirmation screen.

4. The printing apparatus according to claim 1,
  wherein the identifying unit identifies a sheet type of a sheet discharged to the post-processing apparatus within a predetermined time period immediately before receiving the error notification.

5. A control method for a printing apparatus comprising:
a printing step of performing printing;
a sheet-discharging step of discharging a sheet, on which the printing has been performed, to a post-processing apparatus;
a storing step of storing information on a prohibited sheet which is prohibited to be discharged to the post-processing apparatus;
a receiving step of receiving an error notification from the post-processing apparatus;
an identifying step of identifying, when the receiving step has received the error notification from the post-processing apparatus, a type of a sheet, which has been discharged to the post-processing apparatus immediately before the receiving step has received the error notification; and
a display step of displaying a confirmation screen for a user to confirm whether to register the sheet type identified by the identifying step as a type of the prohibited sheet,
wherein in a case where the user issues an instruction to register the sheet type identified by the identifying step as a type of the prohibited sheet through the confirmation screen, the storing step registers information on the sheet type identified by the identifying step as the prohibited sheet.

6. A non-transitory computer-readable storage medium storing a program for causing a computer to execute a control method for a printing apparatus, the control method comprising:
a printing step of performing printing;
a sheet-discharging step of discharging a sheet, on which the printing has been performed, to a post-processing apparatus;
a storing step of storing information on a prohibited sheet which is prohibited to be discharged to the post-processing apparatus;
a receiving step of receiving an error notification from the post-processing apparatus;
an identifying step of identifying, when the receiving step has received the error notification from the post-processing apparatus, a type of a sheet, which has been discharged to the post-processing apparatus immediately before the receiving step has received the error notification; and
a display step of displaying a confirmation screen for a user to confirm whether to register the sheet type identified by the identifying step as a type of the prohibited sheet,
wherein in a case where the user issues an instruction to register the sheet type identified by the identifying step as a type of the prohibited sheet through the confirmation screen, the storing step registers information on the sheet type identified by the identifying step as the prohibited sheet.

* * * * *